(12) United States Patent
Chung et al.

(10) Patent No.: US 6,836,290 B1
(45) Date of Patent: Dec. 28, 2004

(54) COMBINED SINGLE-ENDED AND DIFFERENTIAL SIGNALING INTERFACE

(75) Inventors: Randall M. Chung, Laguna Hills, CA (US); Ferry Gunawan, Santa Ana, CA (US); Dino D. Trotta, Costa Mesa, CA (US)

(73) Assignee: Conexant Systems, Inc., Newport Beach, CA (US)

( * ) Notice: Subject to any disclaimer, the term of this patent is extended or adjusted under 35 U.S.C. 154(b) by 0 days.

(21) Appl. No.: 09/302,090

(22) Filed: Apr. 29, 1999

Related U.S. Application Data

(63) Continuation-in-part of application No. 09/062,343, filed on Apr. 17, 1998, now abandoned.

(51) Int. Cl.[7] .............................................. H04N 3/14
(52) U.S. Cl. ........................ 348/294; 326/81; 327/52; 375/219; 375/316
(58) Field of Search ................................ 348/294, 302; 326/21, 31, 33, 56, 80–83; 327/50, 51, 52, 333; 375/219, 220, 257, 258, 286–288, 316–319; H04N 3/14

(56) References Cited

U.S. PATENT DOCUMENTS

| | | | |
|---|---|---|---|
| 5,485,488 A | 1/1996 | Van Brunt et al. | 375/257 |
| 5,625,412 A | 4/1997 | Aciu et al. | 348/222 |
| 5,761,244 A * | 6/1998 | Hedberg | 375/257 |
| 5,864,587 A * | 1/1999 | Hunt | 375/316 |
| 5,880,599 A * | 3/1999 | Bruno | 326/56 |
| 5,987,543 A * | 11/1999 | Smith | 710/70 |

FOREIGN PATENT DOCUMENTS

| | | |
|---|---|---|
| EP | 0778 516 A | 6/1997 |
| EP | 0778 517 A | 6/1997 |

OTHER PUBLICATIONS

M.H. Unewisse et al., A General Control System for Imaging Arrays, Measurement Science and Technology, vol. 5, No. 4, Apr. 1994, pp. 347–352, XP000446308.

"Introduction to LVDS," Chapter 1, by John Goldie, from National Semiconductor Note, Jan., 1996.

* cited by examiner

*Primary Examiner*—Ngoc-Yen Vu

(57) ABSTRACT

A data interface for CMOS imagers is disclosed that can be either a single-ended interface or a differential interface. The single-ended interface provides compatibility with many existing external devices. Further providing a differential interface allows a lower noise and a lower power interface for external devices that can support a differential signal. The combined single-ended and differential signal interface does not increase the number of pins required for a single-ended only interface. The data transfer width is set to the word width, which allows a fixed timing relationship between the clock edge and data transfer in both single-ended and differential modes. In single-ended mode, the data is transferred once per clock, but in the differential mode, the data is transferred twice per clock, once on each clock edge. This fixed timing relationship eliminates the need for and cost of explicit bit synchronization.

19 Claims, 4 Drawing Sheets

COMBINED SINGLE-ENDED AND DIFFERENTIAL SIGNALING INTERFACE

This application is a continuation-in-part of application of U.S. Ser. No. 09/062,343 filed on Apr. 17, 1998 now abandoned.

BACKGROUND OF THE INVENTION

1. Field of the Invention

The present invention relates generally to the field of interface circuits, and more particularly, to interface circuitry for providing selectable single-ended and differential signal output from a CMOS image sensor to an external digital signal processor.

2. Description of Related Art

One of the advantages of CMOS image sensors (CMOS imagers) over CCD imagers is that the CMOS imager chip can include digital signal processing circuitry. In practice, the signal processing is more often performed on a companion chip, in order to provide greater application flexibility. However, CMOS imagers often have integrated analog to digital converters to convert the analog signal to a digital bit stream that can be processed by the companion chip. The digitized information then must be transferred to companion chip or other external devices for picture storage, processing, or transmission. A single-ended interface is the most common and simplest implementation for data transfer. An example of a single-ended interface is shown in FIG. 1. A driver circuit 2 in the CMOS imager 1 outputs a signal to the companion processing chip 3. A receiver 4 receives and amplifies the signal for further processing. FIG. 2 is a schematic of one possible CMOS implementation of the above-described single-ended interface.

A differential interface can minimize power and noise generation as compared to a single-ended interface, but generally requires twice the number of signal lines. An example of conventional low voltage differential signaling (LVDS) circuit 11 is shown in FIG. 3. The LVDS 11 circuit includes a current source $I_1$ (nominal 3.5 mA) which drives one of the differential pair lines 13, 15. The receiver 17 has a high DC impedance (it does not source or sink DC current), so the majority of driver current flows across the 100 Ω termination resistor $R_1$ generating about 350 mV across the receiver inputs 19, 21. When the driver 23 switches, it changes the direction of current flow across the resistor $R_1$, thereby creating a valid "one" or "zero" logic state.

LVDS technology saves power in several important ways. The power dissipated by the load (the 100 Ω termination resistor $R_1$ is a mere 1.2 mW. In comparison, an RS 422 driver typically delivers 3 volts across a 100 Ω termination, for 90 mW power consumption—75 times more than LVDS. Similarly, LVDS devices 11 require roughly one-tenth the power supply current of PECL/ECL devices.

Aside from the power dissipated in the load and static $I_{CC}$ current, LVDS also lowers system power requirements through its CMOS current-mode driver design. This design greatly reduces the frequency component of $I_{CC}$. The $I_{CC}$ vs. Frequency plot for LVDS 11 is virtually flat between 10 MHz and 100 MHz for the quad devices (<50 mA total for driver+receiver at 100 MHz). In contrast, single-ended, TTL/CMOS transceivers exhibit dynamic power consumption which increases exponentially with frequency.

To help ensure reliability, LVDS receivers 17 have a fail-safe feature that guarantees the output to be in a known logic state (HIGH) under certain fault conditions. These conditions include open, shorted, or terminated receiver inputs. If the driver 23 loses power, is disabled or is removed from the line, while the receiver 17 stays powered on with inputs terminated, the receiver output remains in a known state with the fail-safe feature.

If LVDS receivers 17 did not have the fail-safe feature and one of the fault conditions occurred, any external noise above the receiver thresholds could trigger the output and cause an error. A receiver without fail-safe could even go into oscillation under certain fault conditions. The fail-safe features ensure that the receiver output will be a HIGH—rather than an unknown state—under fault conditions.

FIG. 4 illustrates CMOS video imaging sensing circuitry according to the preferred embodiment disclosed in co-pending U.S. application Ser. No 09/062,343. This circuitry includes a CMOS image sensor chip 50 and an image processor chip 52. The CMOS image sensor chip 50 typically includes a number of light responsive CMOS pixel sensors which develop analog signals representative of an image. These analog signals are then A to D converted by the ADC circuit to form digital signals $Din_0, Din_1 \ldots Din_n$. The image processor chip 52 includes a data processor 53 which performs various manipulations of the image data such as compression and color processing. The processor 53 may be software driven or a hardware embodiment.

As may be seen, the circuit of FIG. 4 employs a plurality of LVDS circuits 11. Each circuit 11 includes a respective driver 54 and a respective receiver 56. Each driver 54 receives a respective input signal $Din_0, Din_1 \ldots Din_n$, which are digital logic levels of, for example, 3.3 volts for logic "1" and zero volts for logic "0". Changes in state in these signals are transmitted over the differential lines to the respective receivers 56. Each receiver 56 generates a respective output signal $Dout_0, Dout_1, \ldots Dout_n$, which are at the several hundred milli-volt level.

It is possible to use a differential interface as shown in FIG. 4 instead of a single-ended interface on the imager, but existing image processing devices may only support the common single-ended interface of FIG. 1 and not the differential interface. It is possible to place both interfaces on the imager in order to support both types of companion chips, but this would add pins and cost.

The best solution would be to implement an interface that could be selected to either support a single-ended interface or a differential interface using the same number of pins (i.e. without requiring twice the number of pins for the differential interface). This would allow flexibility in supporting both commonly available single-ended image processing devices and new image processing devices with the low noise differential interface.

Using a small number of digital data interface pins will minimize power, IC cost, package cost, and printed circuit board size. However, the data rate per pin is inversely proportional to the number of pins. Higher data rates will result in higher noise such as electromagnetic interference and chip output ground bounce. Also, if the number of digital data interface pins is less than the data word size, then some form of synchronization is often required, which can increase complexity and cost.

One tested imager device has a 4 bit single-ended pixel data interface. The data word size is 12 bits, so each pixel's data is transferred in three clocks, 4 bits at a time. Because multiple clock cycles are required to transfer each pixel data, synchronization codes are required so that the image processing device can tell whether a 4 bit transfer is the most significant, middle significant, or least significant 4 bits of the pixel data. This synchronization adds complexity and cost to the system.

As imagers are developed with greater resolution, the number of pixels per frame is much higher. In order to limit the per pin data rate to a reasonable speed, the interface was widened to the width of the 10 bit pixel data. However, the data rate is still high, and will result in fast signal transition times and in ground bounce. Both of these effects may couple noise into the imager silicon substrate, increasing the noise in the image.

A differential interface may be used, but usually this results in twice the number of pins, because two pins are used for each bit transfer, one for the "true" value (normal value) and another for the "complement" value. Thus, there is a need for an improved interface circuit that would allow either a single-ended or a differential output and using as few pins as possible.

SUMMARY OF THE INVENTION

The present invention is a data interface for CMOS imagers that can be either a single-ended interface or a differential interface. The single-ended interface provides compatibility with many existing external devices. Further, providing a differential interface allows a lower noise and a lower power interface for external devices that can support a differential signal. The combined single-ended and differential signal interface does not increase the number of pins required for a single-ended only interface. The data transfer width is set to the word width, which allows a fixed timing relationship between the clock edge and data transfer in both single-ended and differential modes. In single-ended mode, the data is transferred once per clock, but in the differential mode, the data is transferred twice per clock, once on each clock edge. This fixed timing relationship eliminates the need for and cost of explicit bit synchronization.

BRIEF DESCRIPTION OF THE DRAWINGS

The exact nature of this invention, as well as its objects and advantages, will become readily apparent from consideration of the following specification as illustrated in the accompanying drawings, in which like reference numerals designate like parts throughout the figures thereof, and wherein.

DETAILED DESCRIPTION OF THE PREFERRED EMBODIMENTS

The following description is provided to enable any person skilled in the art to make and use the invention and sets forth the best modes contemplated by the inventor for carrying out the invention. Various modifications, however, will remain readily apparent to those skilled in the art, since the basic principles of the present invention have been defined herein specifically to provide an interface circuit for providing a selectable single-ended and differential signal output from a CMOS image sensor to an external digital signal processor.

Figure 5:
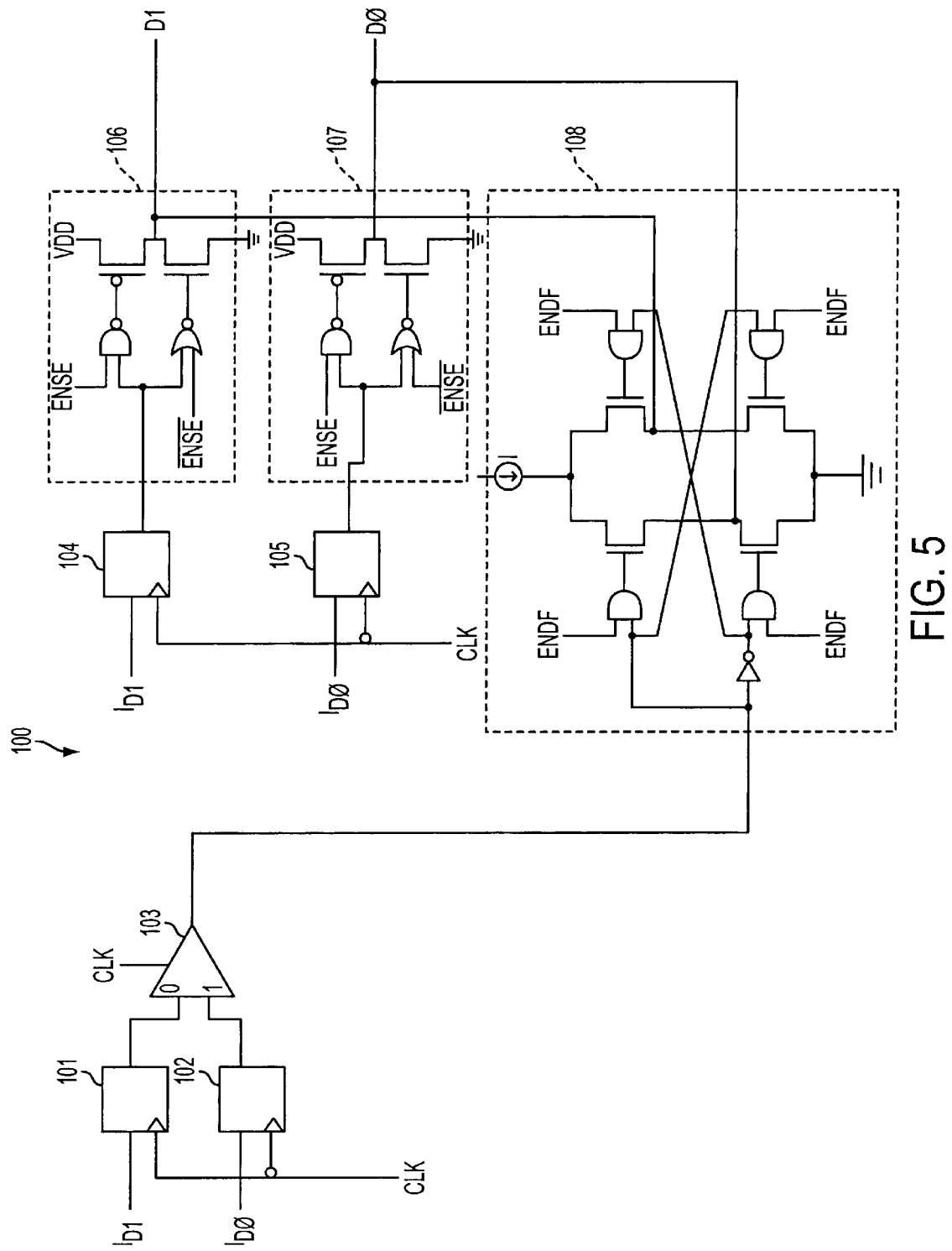
FIG. 5 is a schematic diagram of the present invention according to one embodiment.

The present invention is a data interface that can be either a single-ended interface or a differential interface. A preferred embodiment of the present invention will now be described with reference to FIG. 5. The circuit 100 of FIG. 5 is selectable to provide either a single-ended output or a differential output. If a single-ended output is desired, the ENSE signal is enabled, and if a differential output is desired, the ENDF signal is enabled. Since only one mode can be selected at a time, the ENSE and ENDF signals are complementary. Thus, a single register bit for selecting the type of output may be used. The interface is simplest when the single-ended data interface width is equal to the pixel word width. In the preferred embodiment, the data width is 10 bits, so 10 pins are used. FIG. 5 illustrates the operation for two pins of the circuit, but those skilled in the art will understand how to duplicate the necessary circuitry to produce the desired number of output pins. All of the data bits are transferred on one edge of the clock, for instance on the rising edge of the clock.

For single-ended operation, the internal digitized signals $I_{D0}$ and $I_{D1}$ are clocked through flip-flops 104, 105 and the single-ended output drivers 106, 107 drive the output signal lines. The single-ended outputs D0 and D1 are thus provided to the companion chip or other off-chip circuitry. The differential circuitry 108 is not enabled, and thus does not interfere with the single-ended operation.

When a differential output is desired, however, the differential circuitry 108 is enabled, and the single-ended circuitry 106, 107 is disabled. In the differential mode, half of the bits are transferred on one edge of the clock and the other half on the other edge of the clock. This clocking scheme uses the same number of pins as used for the single-ended interface. Thus, no explicit synchronization is required when the relationship of clock edge to data transfer is kept constant. The internal digitized signals $I_{D0}$ and $I_{D1}$ are clocked through flip-flops 101, 102 and a multiplexer 103 such that on a rising clock edge on signal is selected and on a falling clock edge the other single is selected. The output of the multiplexer 103 is provided to the differential interface circuitry 108 to produce both the normal output and the complement output signal. So on one half of the clock cycle, half the bits are produced in differential form, and on the other half of the clock cycle, the remaining bits are produced. Thus, a differential output is produced without requiring twice the number of pins, or complicated bit synchronization schemes that slow the data transfer.

Figure 1:
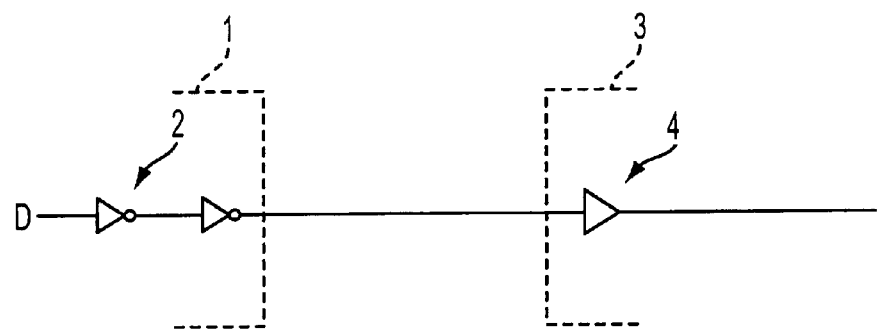
FIG. 1 is a diagram illustrating a typical single-ended interface implemented in CMOS.
Figure 2:
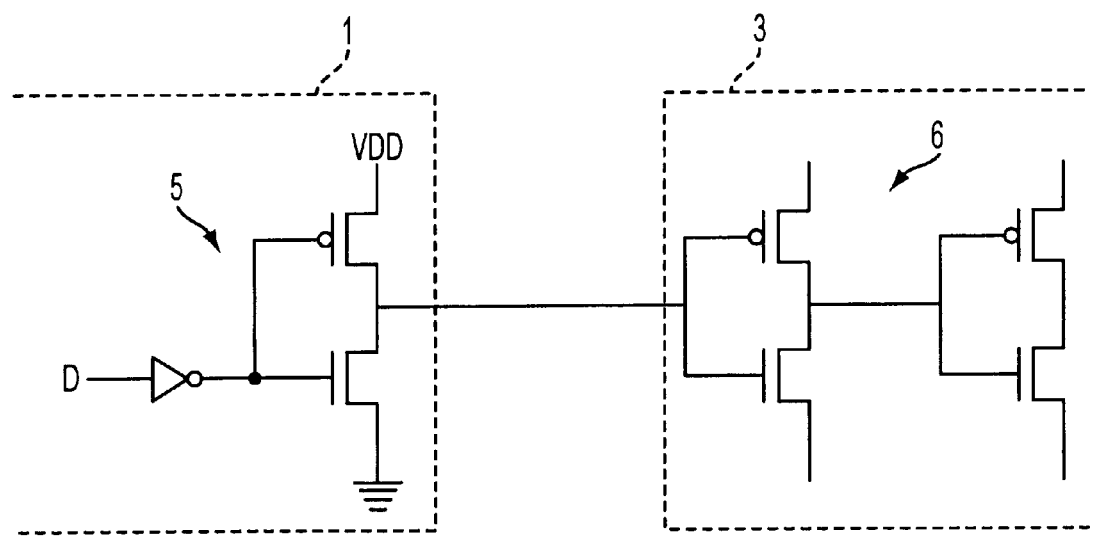
FIG. 2 is a schematic diagram of the single-ended interface of FIG. 1.
Figure 3:
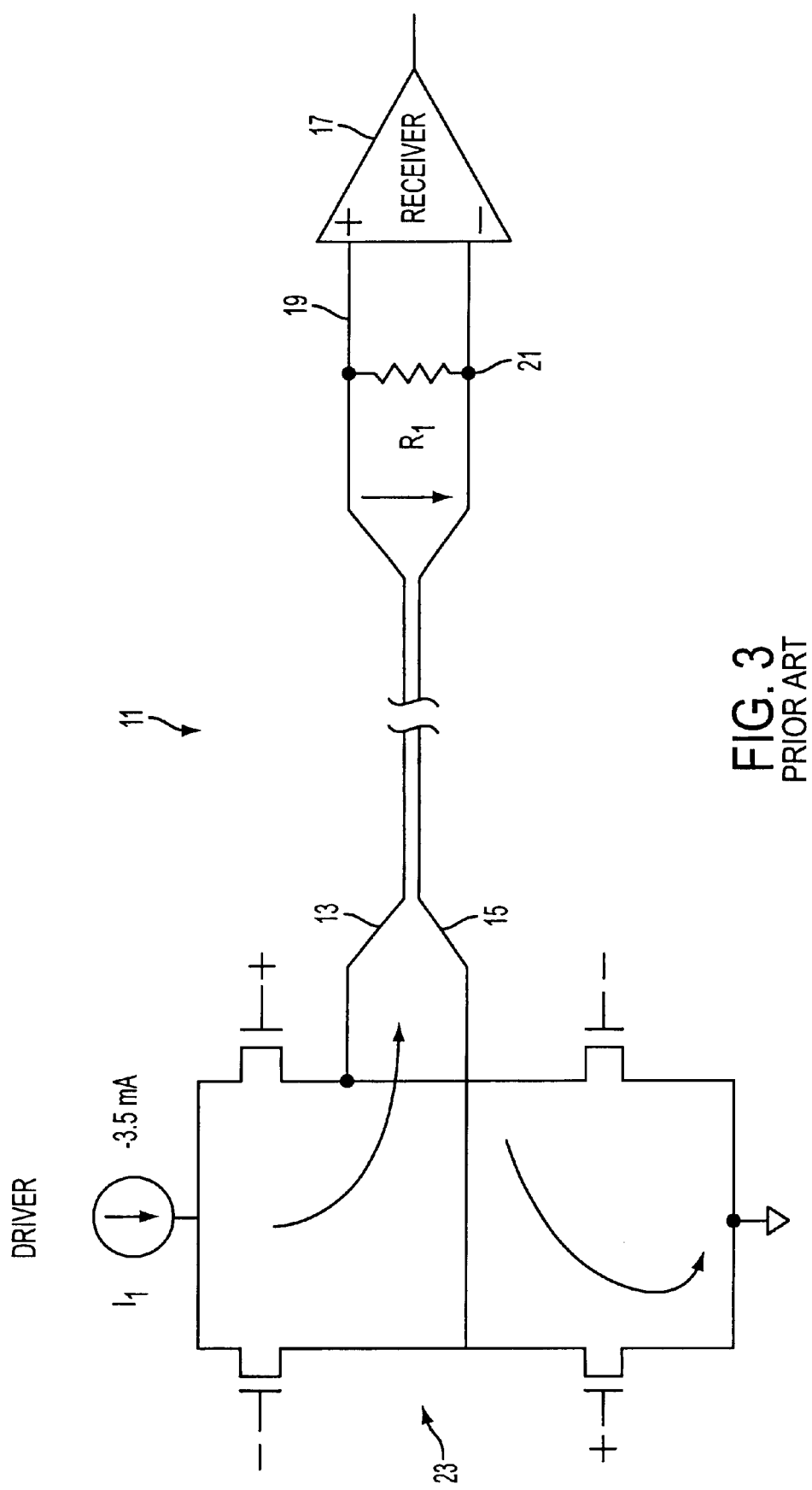
FIG. 3 is a schematic diagram of a differential interface circuit.
Figure 4:
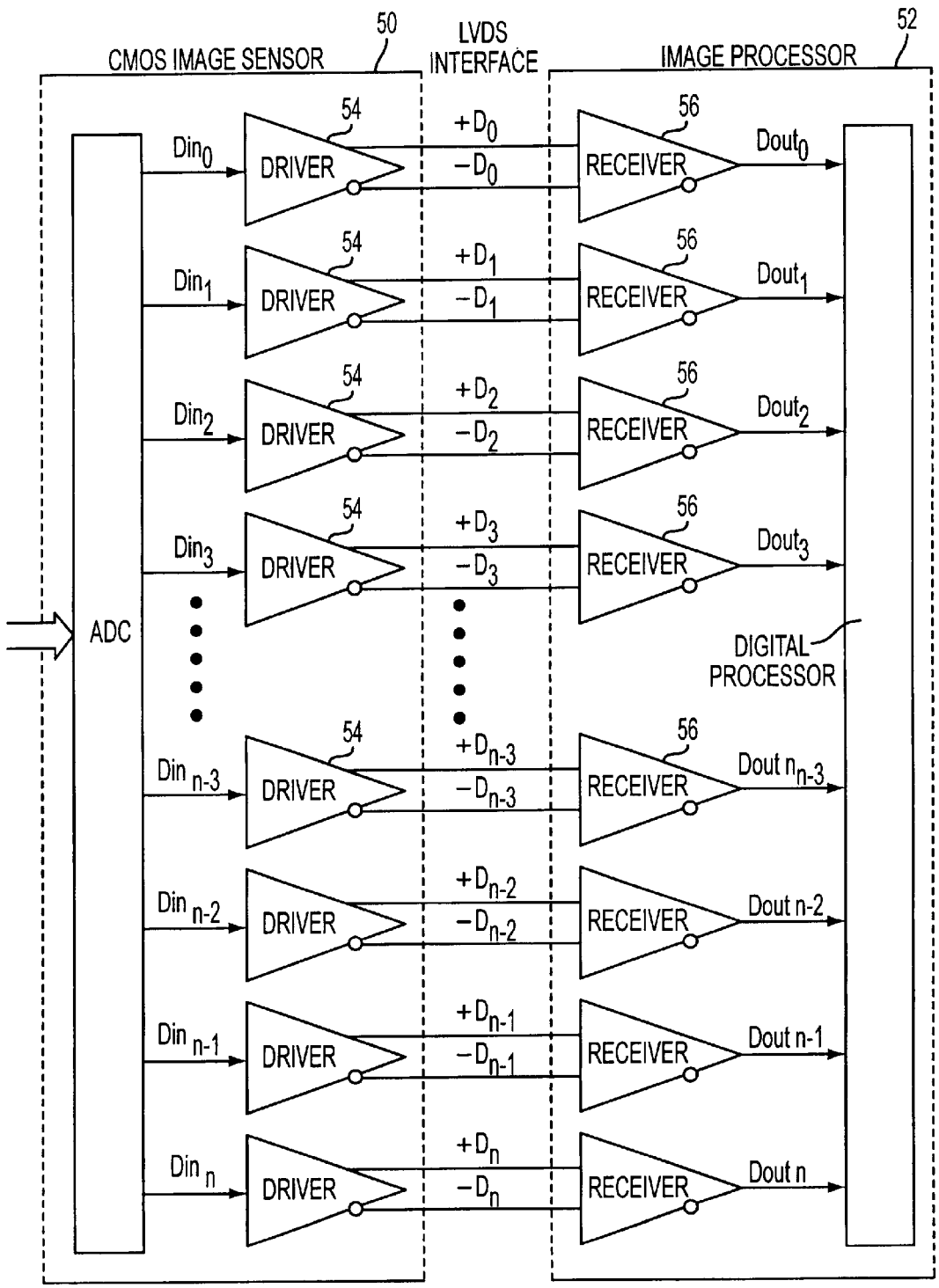
FIG. 4 is a diagram illustrating an application of the differential interface circuit of FIG. 3 in an imager.

All known prior art CMOS imagers have used single-ended interfaces. Allowing the use of a single-ended interface gives the opportunity of interfacing to many existing external devices. Allowing the use of a differential interface will allow a lower noise and a lower power interface. Using a combined single-ended and differential signal interface will not increase the number of pins required for a single-ended only interface. Setting the data transfer width to the word width allows a fixed timing relationship between the clock edge and data transfer in both single-ended and differential modes. This fixed timing relationship eliminates the need for and cost of explicit synchronization. The present invention may be used in place of the exclusively differential interface illustrated in FIG. 4, to provide greater interface flexibility.

Those skilled in the art will appreciate that various adaptations and modifications of the just-described preferred embodiment can be configured without departing from the scope and spirit of the invention. Therefore, it is to be understood that, within the scope of the appended claims, the invention may be practiced other than as specifically described herein.

What is claimed is:

1. A data interface circuit comprising:
    a first single-ended interface connected to a first signal output line;
    a second single-ended interface connected to a second signal output line; and
    a differential interface having a normal signal output connected to the first output line and a complementary signal output connected to the second signal output line;
    wherein an output of the data interface circuit is selectable between a single-ended interface output and a differential interface output.

2. The circuit of claim 1, wherein when the single-ended output is selected, one bit is transferred per clock cycle on each signal output line.

3. The circuit of claim 2, wherein when the differential output is selected, one half of the total output bits are transferred on a first edge of a clock, and a second half of the output bits are transferred on a second edge of the clock, using the same total number of pins as the single-ended interface.

4. The circuit of claim 3, wherein the circuit is incorporated into a CMOS image sensor chip.

5. The circuit of claim 3 further comprising a plurality of sets of single-ended and differential interface circuits, and wherein the circuit is incorporated into a CMOS image sensor chip.

6. The circuit of claim 3 further comprising a plurality of sets of single-ended and differential interface circuits.

7. The circuit of claim 6, wherein the circuit includes 5 sets of single-ended and differential interface circuits for driving 10 output lines.

8. The circuit of claim 6, wherein a data transfer width is set to a word width of an output of a CMOS image sensor.

9. The circuit of claim 6 wherein the circuit includes 5 sets of single-ended and differential interface circuits for driving 10 output lines, and a data transfer width is set to a word width of an output of a CMOS image sensor.

10. A CMOS imaging apparatus comprising:
    a CMOS image sensor, the sensor having a data interface circuit comprising:
        a first single-ended interface connected to a first signal output line;
        a second single-ended interface connected to a second signal output line; and
        a differential interface having a normal signal output connected to the first output line and a complementary signal output connected to the second signal output line;
        wherein an output of the data interface circuit is selectable between a single-ended interface output and a differential interface output; and
    an image processor connected to the CMOS image sensor to receive the signals output by the data interface circuit.

11. The apparatus of claim 10, wherein when the single-ended output is selected, one bit is transferred per clock cycle on each signal output line.

12. The apparatus of claim 11, wherein when the differential output is selected, one half of the total output bits are transferred on a first edge of a clock, and a second half of the output bits are transferred on a second edge of the clock, using the same total number of pins as the single-ended interface.

13. The apparatus of claim 12 further comprising a plurality of sets of single-ended and differential interface circuits.

14. The apparatus of claim 13, wherein the circuit includes 5 sets of single-ended and differential interface circuits for driving 10 output lines.

15. The circuit of claim 13, wherein a data transfer width is set to a word width of an output of the CMOS image sensor.

16. The apparatus of claim 13 wherein the circuit includes 5 sets of single-ended and differential interface circuits for driving 10 output lines, and a data transfer width is set to a word width of an output of the CMOS image sensor.

17. An image processing method comprising the steps of:
    forming an analog image signal using a plurality of CMOS image sensing pixels;
    converting the analog image signal to form a plurality of digital output signals;
    transferring the digital output signals through either a single-ended or a differential interface circuit, as selected, to a digital image processor;
    wherein when the single-ended output is selected, one bit is transferred per clock cycle on each signal output line, and when the differential output is selected, one half of the total output bits are transferred on a first edge of a clock, and a second halt of the output bits are transferred on a second edge of the clock, using the same total number of pins as used in by the single-ended interface.

18. The method of claim 17 wherein the method is implemented using a CMOS image sensor chip.

19. The method of claim 17 wherein transferring the digital output signals through either the single-ended or the differential interface circuit further comprises transferring the digital output signals through either a plurality of sets of single-ended or a plurality of differential interface circuits.

* * * * *